(No Model.)
E. C. AKERS.
ALARM FOR BICYCLES.
No. 603,032.  Patented Apr. 26, 1898.
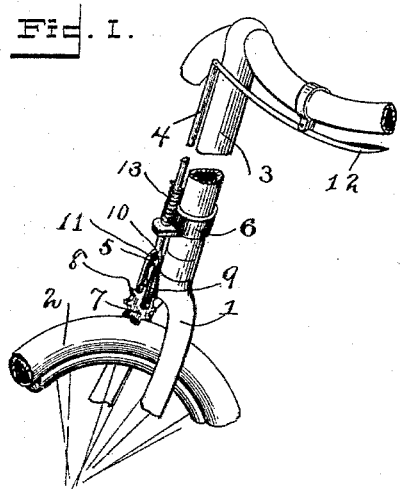
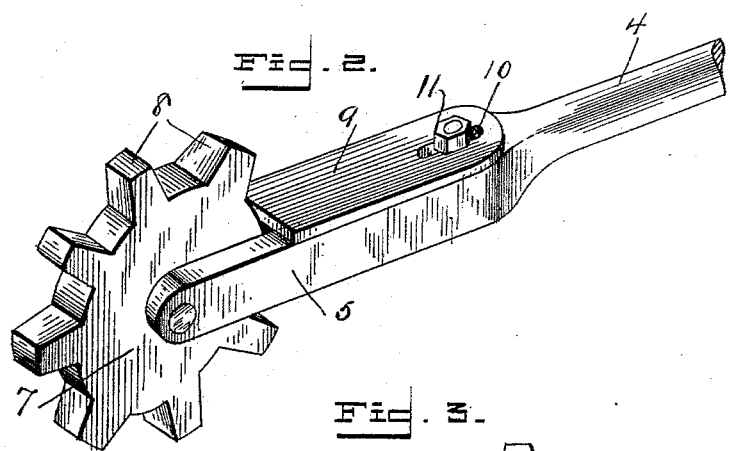
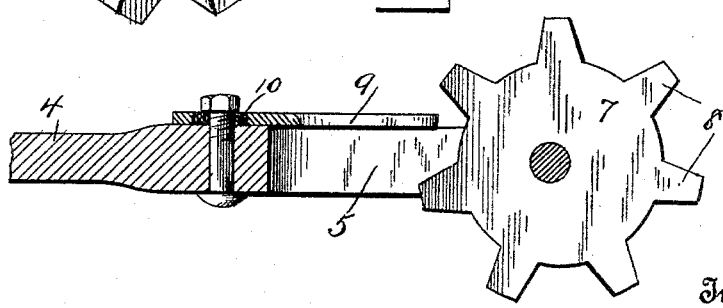
Witnesses:
Fenton S. Belt.
J. A. Willson.
Inventor:
Earl C. Akers,
by H. B. Willson,
Attorney.

UNITED STATES PATENT OFFICE.

EARL C. AKERS, OF PORT HURON, MICHIGAN, ASSIGNOR OF ONE-HALF TO RANSOM E. MOSS, OF SAME PLACE.

ALARM FOR BICYCLES.

SPECIFICATION forming part of Letters Patent No. 603,032, dated April 26, 1898.

Application filed March 16, 1897. Serial No. 627,742. (No model.)

*To all whom it may concern:*

Be it known that I, EARL C. AKERS, a citizen of the United States, residing at Port Huron, in the county of St. Clair and State of Michigan, have invented certain new and useful Improvements in Alarms for Vehicles; and I do declare the following to be a full, clear, and exact description of the invention, such as will enable others skilled in the art to which it appertains to make and use the same.

My invention relates to an alarm for vehicles; and the object is to provide a device of this character which will give a distinct audible alarm resembling very much the noise made by Mexican locusts.

With this object in view the invention consists in certain features of construction and combination of parts, which will be hereinafter fully described and claimed.

In the accompanying drawings, Figure 1 is a perspective view of a portion of a bicycle-frame, illustrating the application of my invention. Fig. 2 is a detail perspective view of the alarm, and Fig. 3 is a longitudinal vertical sectional view of the same.

In said drawings, 1 denotes the front fork of a bicycle, 2 the steering-wheel, and 3 the steering-head.

The alarm consists of a bar 4, which is forked or bifurcated to form parallel arms 5 and is clamped to the steering-head by clamps 6. A wheel 7 is pivoted between the arms 5 at their lower ends and is provided on its periphery with blunt or dull pointed teeth 8, which are adapted to be brought into engagement with the tire of a bicycle to sound the alarm. A spring-tongue 9 is clamped to the bar and is vertically adjustable thereon, so as to allow it to be set with respect to the teeth to vary the degree of sound caused by the rotation of the toothed wheel. To secure this adjustment, I form the tongue with a longitudinal opening through which a bolt 10 passes. A nut 11 is employed to clamp the tongue to the bar. The spring-tongue normally rests against the front edges of the arm 5 throughout its entire length and in conjunction with said arms forms what may be properly termed a "resonator," thereby materially increasing the volume of sound irrespective of the increase effected by the adjustment of the tongue.

12 denotes a handle-lever, one of the ends of which is pivoted to the upper end of the bar, and by means of which the toothed wheel is brought into engagement with the tire of the bicycle and caused to revolve. When the handle is released, a spring 13 is employed to retract or raise the bar and its toothed wheel from engagement with the tire.

Although I have described my invention as applied to a bicycle, it is evident that it may be used in connection with any vehicle or rolling or revolving body where it is desired to sound an alarm. It will be found to be very useful on hose-carts, fire-engines, ambulances, street-cars, and the like, and I therefore do not desire to be restricted in its application to bicycles.

Having thus described my invention, what I claim, and desire to secure by Letters Patent, is—

An audible alarm for vehicles, consisting of a bar bifurcated to form parallel arms, a toothed wheel journaled between the lower ends of said arms, and a spring-tongue having one end adjustably secured to the bar, whereby the volume of sound may be varied, said spring-tongue normally lying against the edges of the parallel arms and forming in conjunction with said arms a resonator, substantially as set forth.

In testimony whereof I hereunto affix my signature in presence of two witnesses.

EARL C. AKERS.

Witnesses:
WM. R. RYAN,
J. MCARTHUR, Jr.